(12) United States Patent
Takizawa et al.

(10) Patent No.: US 11,370,371 B2
(45) Date of Patent: Jun. 28, 2022

(54) VEHICLE

(71) Applicant: HONDA MOTOR CO., LTD., Tokyo (JP)

(72) Inventors: Kazuaki Takizawa, Saitama (JP); Makoto Hatami, Saitama (JP); Takanori Suzuki, Saitama (JP); Naoto Kochi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 391 days.

(21) Appl. No.: 16/567,250

(22) Filed: Sep. 11, 2019

(65) Prior Publication Data

US 2020/0079305 A1    Mar. 12, 2020

(30) Foreign Application Priority Data

Sep. 12, 2018 (JP) .............................. JP2018-170802

(51) Int. Cl.
| | |
|---|---|
| *H02J 7/00* | (2006.01) |
| *B60R 16/023* | (2006.01) |
| *H02G 3/08* | (2006.01) |
| *B60L 53/14* | (2019.01) |
| *B60K 1/04* | (2019.01) |

(52) U.S. Cl.
CPC ............ *B60R 16/0238* (2013.01); *B60K 1/04* (2013.01); *B60L 53/14* (2019.02); *H02G 3/083* (2013.01); *H02J 7/0045* (2013.01); *B60K 2001/0438* (2013.01); *B60L 2210/10* (2013.01); *B60Y 2200/91* (2013.01)

(58) Field of Classification Search
None
See application file for complete search history.

(56) References Cited

U.S. PATENT DOCUMENTS

| | | |
|---|---|---|
| 2009/0183936 A1 | 7/2009 | Kim et al. |
| 2012/0235471 A1 | 9/2012 | Tanahashi et al. |
| 2013/0134939 A1 | 5/2013 | Sato et al. |
| 2014/0333130 A1 | 11/2014 | Matano et al. |
| 2014/0339009 A1 | 11/2014 | Suzuki et al. |
| 2015/0217707 A1 | 8/2015 | Tanigaki et al. |

(Continued)

FOREIGN PATENT DOCUMENTS

| | | |
|---|---|---|
| JP | H06-199137 A | 7/1994 |
| JP | H07-156826 A | 6/1995 |

(Continued)

OTHER PUBLICATIONS

Feb. 25, 2020, Japanese Office Action issued for related JP Application No. 2018-170802.

*Primary Examiner* — Arun C Williams
(74) *Attorney, Agent, or Firm* — Paratus Law Group, PLLC (57) ABSTRACT

A vehicle includes a vehicle interior, a battery provided below the vehicle interior with a floor panel in between, a front room provided in front of the vehicle interior with a dashboard in between, a charging port disposed in the front room, and a junction box which electrically connects a first power line extending from the charging port and a second power line extending from a power line connection portion of the battery. The junction box is disposed on a virtual line connecting the charging port and the power line connection portion in a side view.

8 Claims, 6 Drawing Sheets

(56) References Cited

U.S. PATENT DOCUMENTS

| | | | |
|---|---|---|---|
| 2015/0224869 A1* | 8/2015 | Matano | B60H 1/3227 180/68.4 |
| 2015/0357609 A1 | 12/2015 | Lang | |
| 2016/0229293 A1 | 8/2016 | Seo et al. | |

FOREIGN PATENT DOCUMENTS

| | | |
|---|---|---|
| JP | 2011-250660 A | 12/2011 |
| JP | 2012-196986 A | 10/2012 |
| JP | 2012-240477 A | 12/2012 |
| JP | 2013-230731 A | 11/2013 |
| JP | 2014-060886 A | 4/2014 |
| JP | 2014-113910 A | 6/2014 |
| JP | 2014-151693 A | 8/2014 |
| JP | 2015-061414 A | 3/2015 |
| JP | WO2014/034377 A1 | 8/2016 |
| KR | 10-2009-0062880 A | 6/2009 |
| WO | WO 2013/080736 A1 | 6/2013 |

\* cited by examiner

VEHICLE

CROSS-REFERENCE TO RELATED APPLICATIONS

This application is based on and claims priority under 35 USC 119 from Japanese Patent Application No. 2018-170802 filed on Sep. 12, 2018.

TECHNICAL FIELD

The present invention relates to a vehicle including a charging port and a battery.

BACKGROUND ART

In the electric vehicle of JP-A-2014-034377, the electric vehicle includes a battery disposed at an underfloor position of a vehicle, a power unit disposed at a vehicle front position of the battery, and a high voltage harness that connects a battery-side power connector terminal provided at a front end portion of the battery and a unit-side high voltage connector terminal provided in the power unit.

However, in JP-A-2014-034377, since the high voltage harness, which is a power transmission path during rapid charging, passes through a high-voltage module that is disposed away from a virtual line connecting the battery-side high voltage connector terminal and the unit-side high voltage connector terminal in a side view, a power transmission path (hereinafter, also referred to as a charging path) during charging is long and the charging efficiency is reduced due to power transmission loss.

SUMMARY

An aspect of the present invention provides a vehicle in which power transmission loss in a charging path is reduced to improve charging efficiency.

An embodiment of the present invention relates to a vehicle, the vehicle includes:

a vehicle interior;

a battery provided below the vehicle interior with a floor panel in between;

a front room provided in front of the vehicle interior with a dashboard in between;

a charging port disposed in the front room; and a junction box which electrically connects a first power line extending from the charging port and a second power line extending from a power line connection portion of the battery, and the junction box is disposed on a virtual line connecting the charging port and the power line connection portion in a side view.

Advantageous Effects of Invention

According to the above embodiment of the present invention, charging efficiency can be improved by reducing power transmission loss in the charging path.

DESCRIPTION OF EMBODIMENTS

Hereinafter, a vehicle according to an embodiment of the present invention will be described with reference to the drawings. The drawings should be seen based on a direction of reference numerals. In the following description, front, rear, left, right, upper, and lower directions are described according a view from an operator. In the drawings, a front side of the vehicle is denoted by Fr, a rear side is denoted by Rr, a left side is denoted by L, a right side is denoted by R, an upper side is denoted by U, and a lower side is denoted by D.

[Overall Structure of Vehicle]

Figure 1:
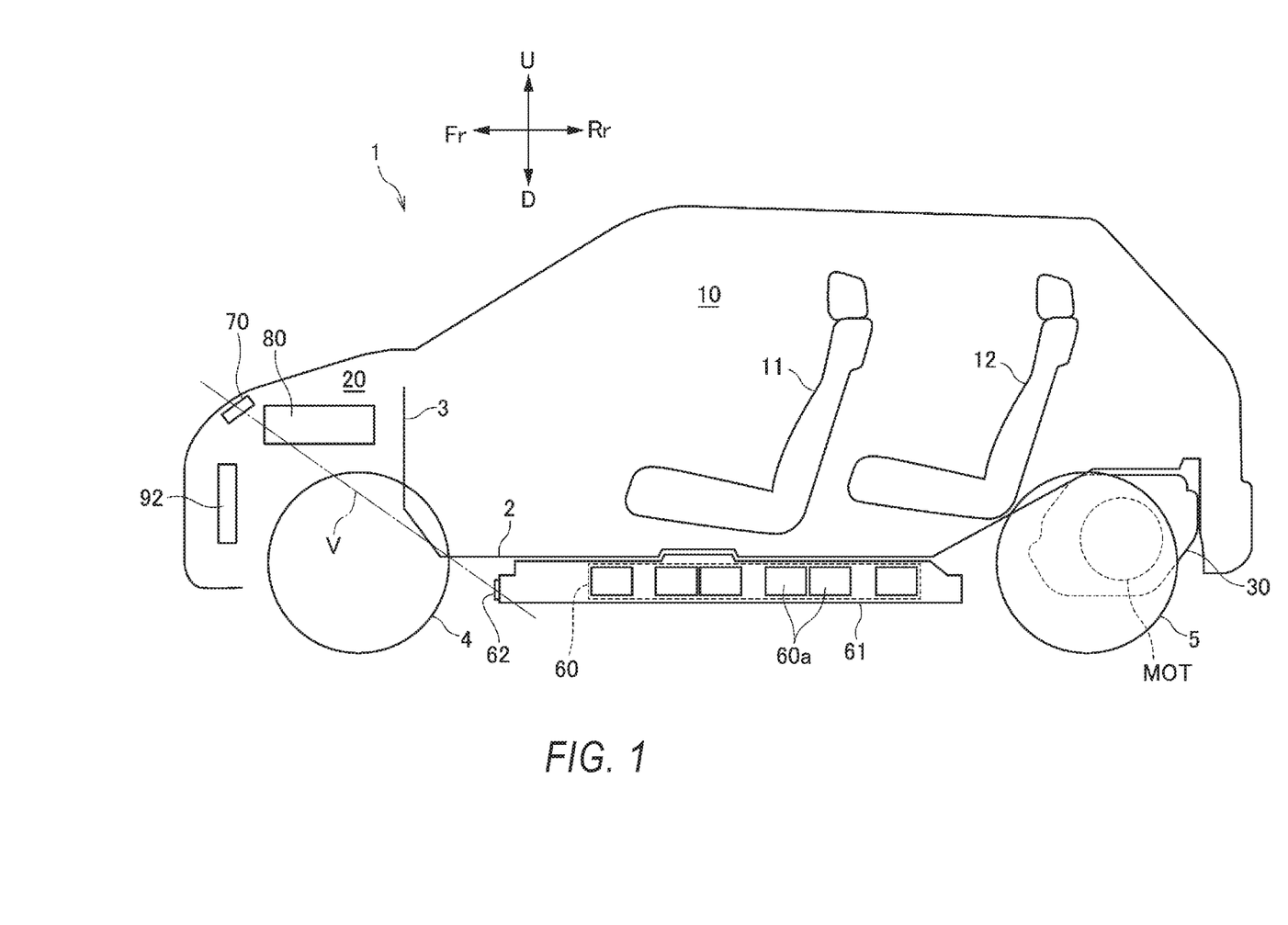
FIG. 1 is a schematic side view showing an overall structure of a vehicle according to an embodiment of the present invention.
Figure 2:
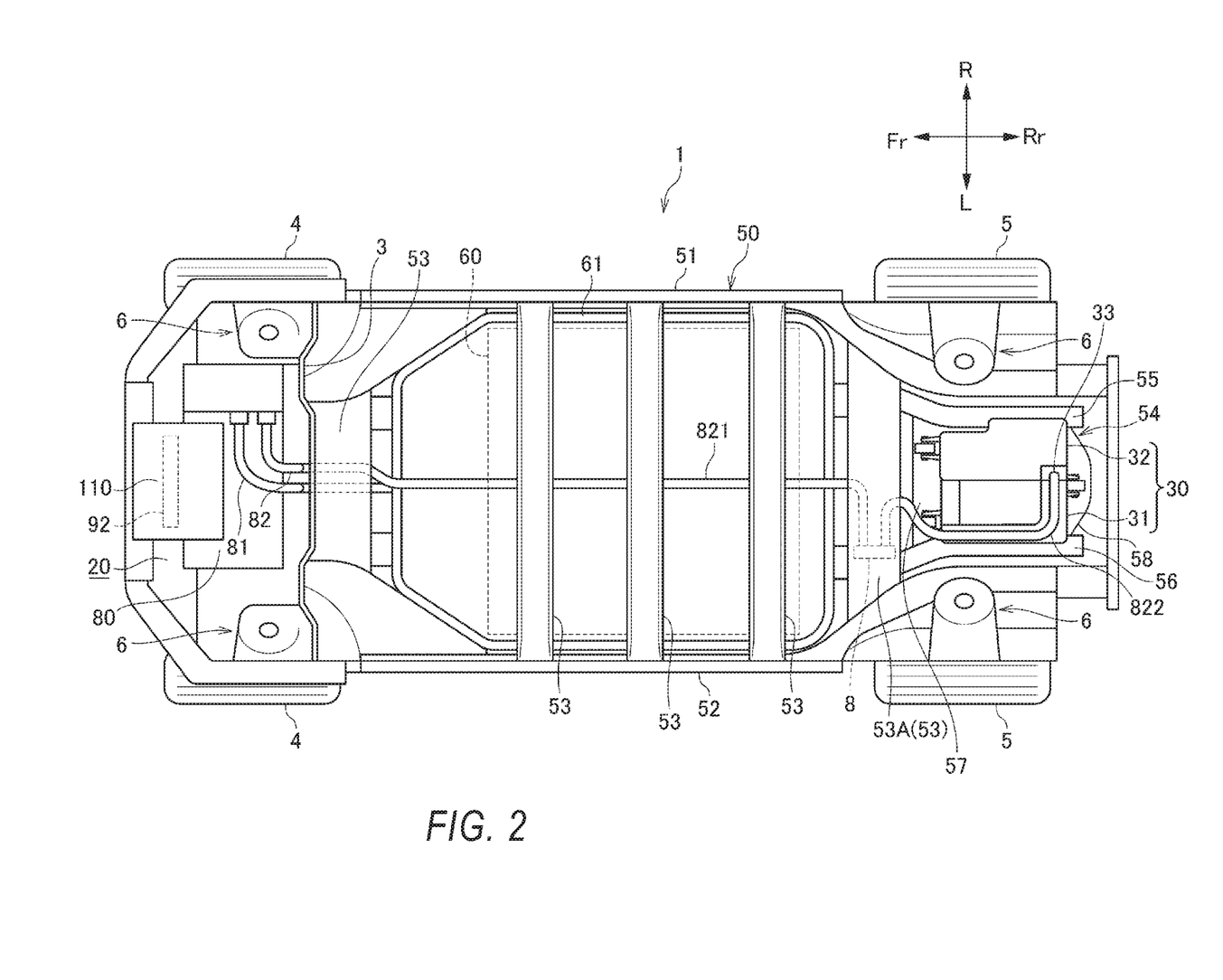
FIG. 2 is a plan view showing an underfloor structure of the vehicle of FIG. 1.

As shown in FIGS. 1 and 2, a vehicle 1 according to an embodiment of the present invention is formed by a vehicle interior 10 and a front room 20 in front of the vehicle interior 10, which are defined by a floor panel 2 and a dashboard 3.

A front seat 11 and a rear seat 12 are provided in the vehicle interior 10. A driving device unit 30 is provided below the floor panel 2 at a rear side of the rear seat 12. The driving device unit 30 drives left and right rear wheels 5. That is, in the vehicle 1, the left and right rear wheels 5 are driving wheels, and left and right front wheels 4 are driven wheels. The front wheels 4 and the rear wheels 5 are supported by a vehicle body frame 50 via a suspension (not shown) supported by respective suspension support portions 6.

A battery 60 including a plurality of battery modules 60a is disposed below the vehicle interior 10. The battery 60 is accommodated in a battery case 61 and is disposed below the floor panel 2. A battery connector 62 is provided on a front surface of the battery case 61.

The vehicle body frame 50 includes a pair of left and right side members 51, 52 extending in a front-rear direction, a plurality of cross members 53 extending in a left-right direction and connecting the side members 51, 52, and a sub-frame 54 having a rectangular shape so as to surround the driving device unit 30. The sub-frame 54 includes a pair of sub-side members 55, 56 supported by the side members 51, 52, a front frame member 57 and a rear frame member 58 that connect sub-side members 55, 56. The driving device unit 30 includes a driving device 31 that accommodates a motor MOT as an electric motor and a Power Control Unit (PCU) 32 as an electric motor control unit that controls the motor MOT.

The driving device 31 and the PCU 32 are electrically connected via a bus bar (not shown).

[Cable Arrangement]

Figure 3:
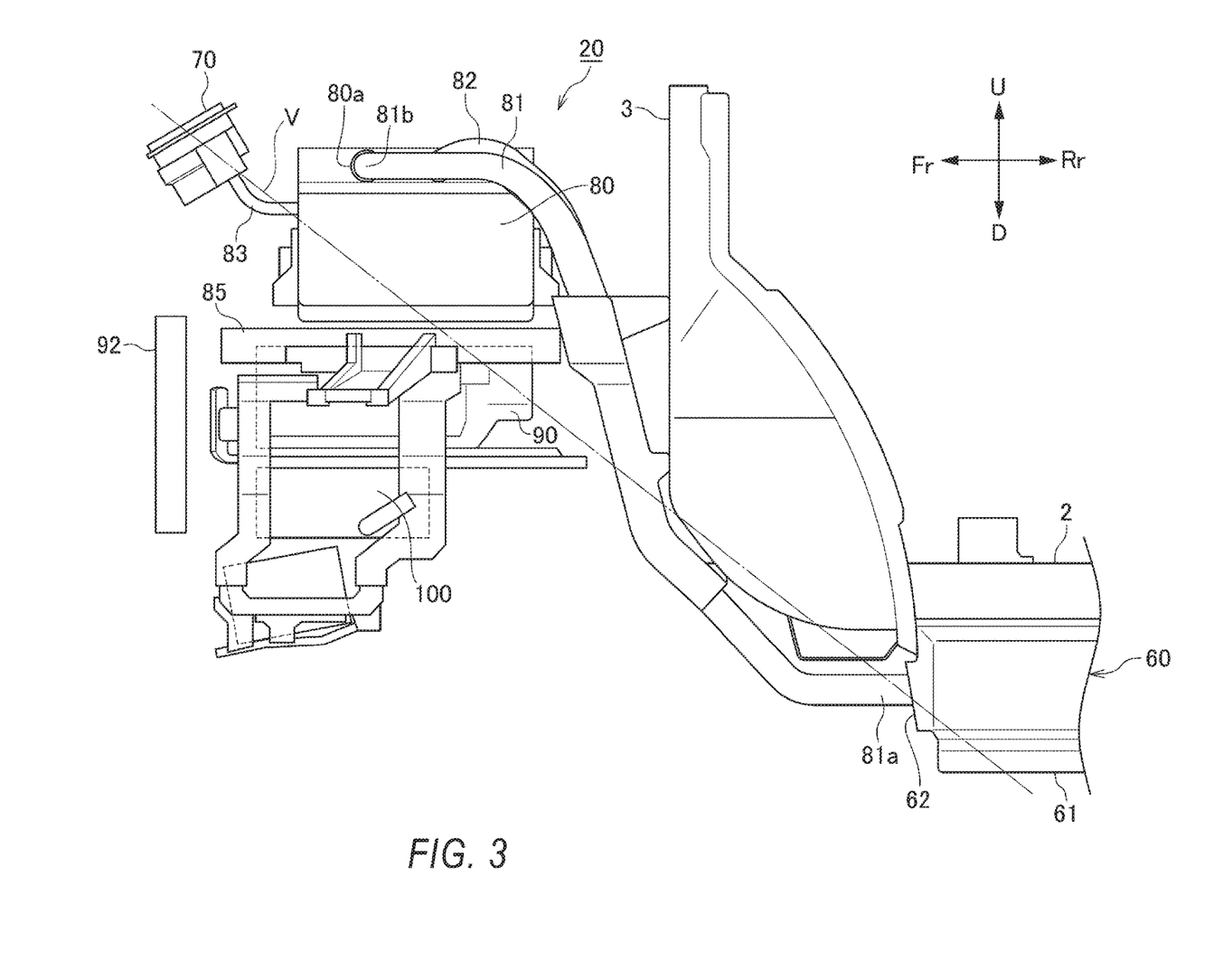
FIG. 3 is a perspective view illustrating a cable arrangement in a front room of the vehicle of FIG. 1.
Figure 4:
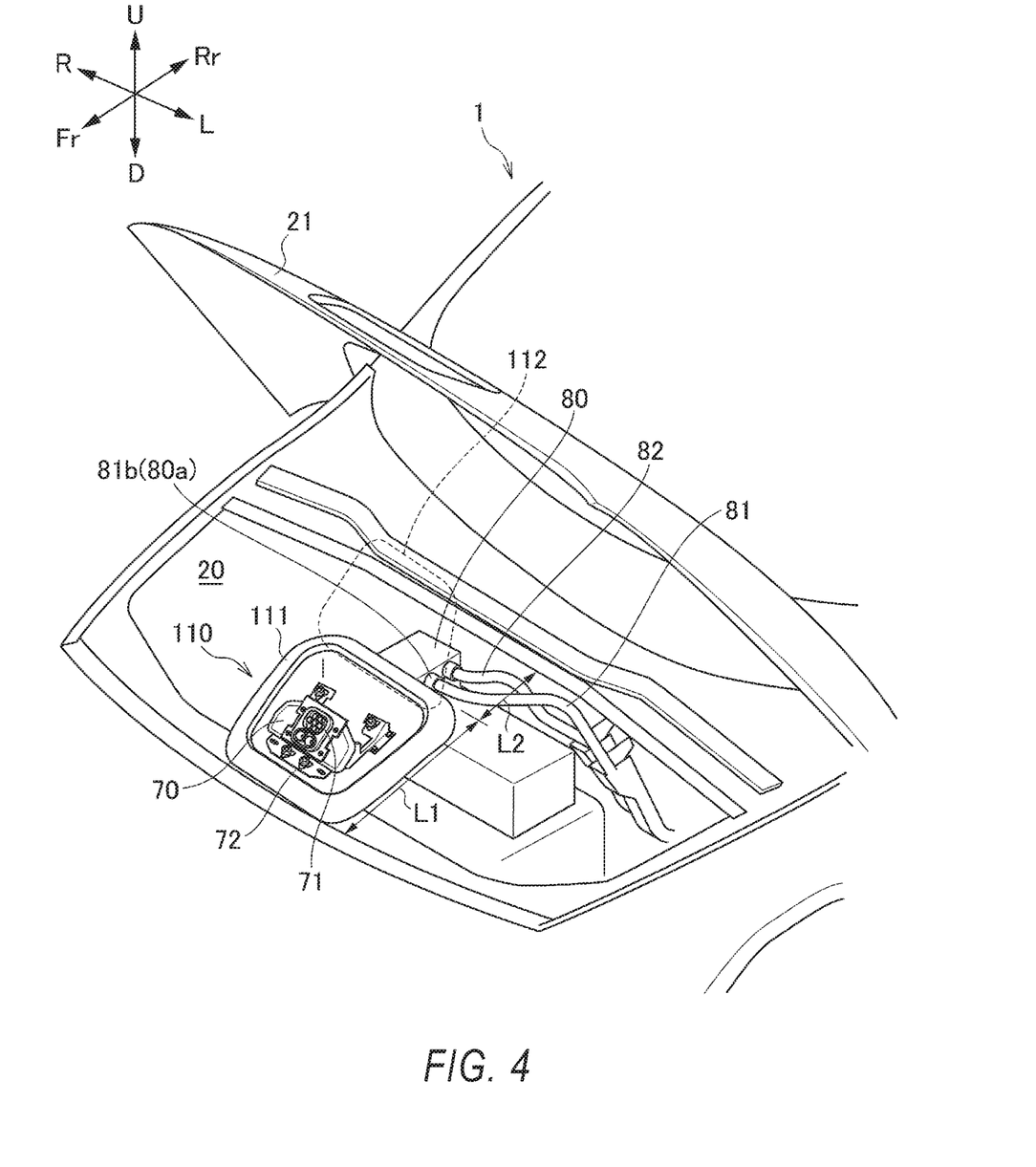
FIG. 4 is a perspective view of the front room of the vehicle of FIG. 1.

As shown in FIG. 3, the front room 20 is provided with a charging port 70, a junction box 80, a charger 90, and a DC-DC converter 100. The junction box 80 is disposed above the charger 90 and the DC-DC converter 100. Further, in the front room 20, a radiator fan 92 is disposed below the charging port 70 and in front of the charger 90 and the DC-DC converter 100. As shown in FIG. 4, the charging port 70 is provided at the upper portion of the front end of the vehicle 1 so as to face obliquely forward. The charging port 70 is provided with a quick charging port 71 and a normal charging port 72.

Figure 6:
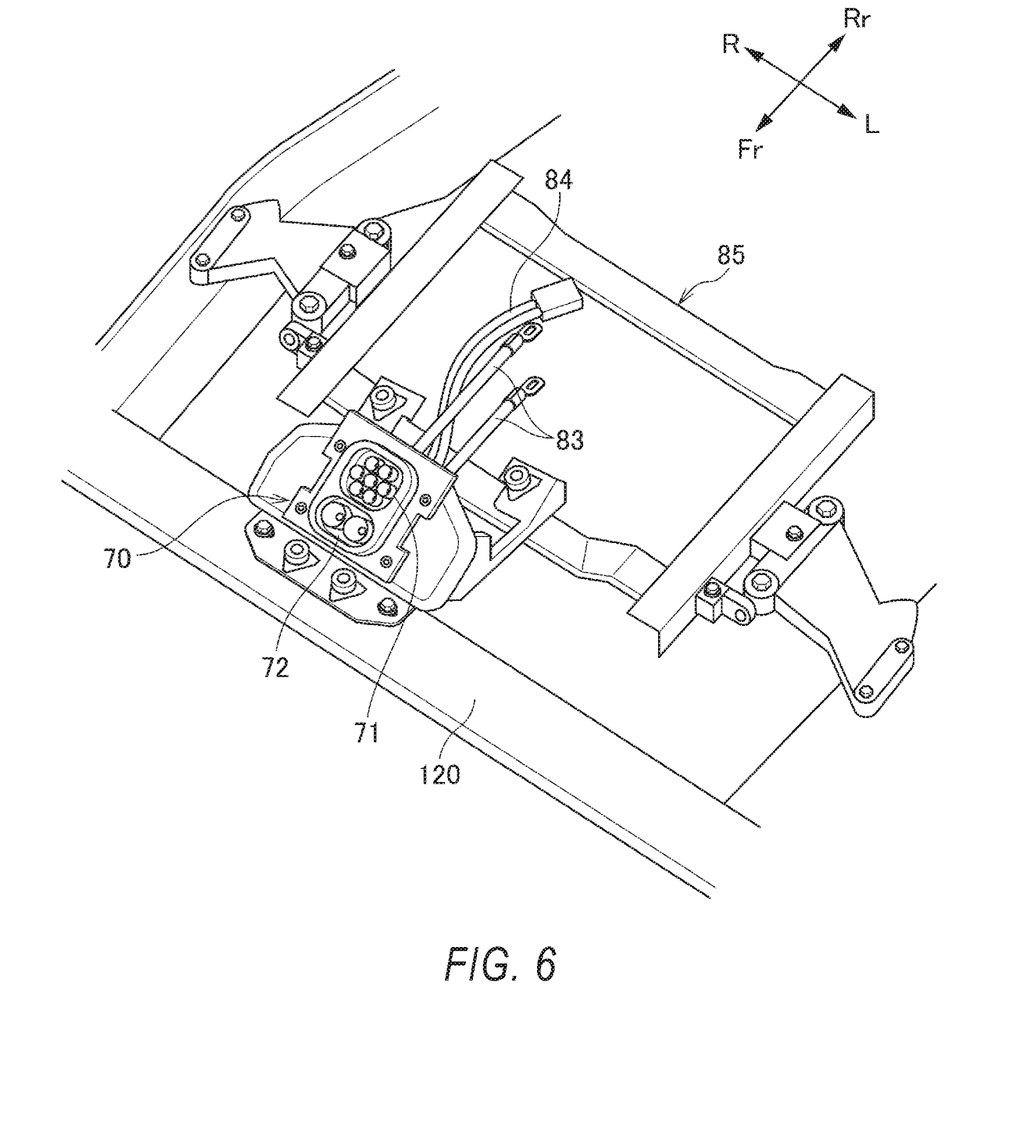
FIG. 6 is a perspective view of the charging port of the vehicle of FIG. 1 and the periphery thereof.

The junction box 80 electrically connects a quick charging cable 83 extending from the quick charging port 71 of the charging port 70 and a battery cable 81 extending from the battery connector 62 of the battery 60. The quick charging cable 83 and the battery cable 81 are DC lines. Further, the charging port 70 is electrically connected to the charger 90 via a normal charging cable 84 shown in FIG. 6. The normal charging cable 84 is an AC line. In FIG. 6, reference numeral 85 denotes an accessory frame which holds the charger 90 and the DC-DC converter 100 and on which the junction box 80 is mounted.

As shown in FIG. 3, the junction box 80 is disposed on a virtual line V connecting the charging port 70 and the battery connector 62 in a side view. Incidentally, "disposed on the virtual line V" means that at least a part of the junction box 80 overlaps with the virtual line V in a side view. The battery cable 81 is disposed so as to extend along the virtual line V. Incidentally, "along the virtual line V" is not limited to overlapping the virtual line V in a straight line, and may extend substantially parallel to the virtual line V, and may extend in an S-shape across the virtual line V as in the present embodiment.

With this configuration, since the length of the quick charging cable 83 and the battery cable 81 can be shortened, the power transmission loss in the charging path can be reduced and the charging efficiency can be increased. Further, since the quick charging cable 83 and the battery cable 81 are DC lines used for quick charging, a large diameter cable required for the quick charging path can be shortened, and the manufacturing cost and the cable weight can be reduced.

As shown in FIG. 2, the junction box 80 is electrically connected to the driving device unit 30 via a PCU cable 82. The PCU cable 82 includes a first cable 821 extending from the junction box 80 and a second cable 822 extending from the PCU 32, the first cable 821 and the second cable 822 are connected to each other via a joint box 8 fixed to a lower surface of a cross member 53 (hereinafter, referred to as a support cross member 53A) located between the battery 60 and the driving device unit 30.

Here, the combined length of the quick charging cable 83 and the battery cable 81 is shorter than the combined length of the battery cable 81 and the PCU cable 82. According to this configuration, since the combined length of the quick charging cable 83 and the battery cable 81, that is, the length of the power transmission path during charging, is shorter than the combined length of the battery cable 81 and the PCU cable 82, that is, the length of the power transmission path during discharging, the power transmission loss in the charging path can be reduced and the charging efficiency can be improved.

As shown in FIG. 3, a cable connector 81a of the battery cable 81 is connected to the battery connector 62 from the front side. As shown in FIGS. 2 to 5, a cable connector 81b of the battery cable 81 is connected to a JB connector 80a of the junction box 80 from the vehicle width direction. In this way, the battery cable 81 can be gently bent by changing the connection direction of the battery cable 81 using the battery connector 62 and the JB connector 80a.

Figure 5:
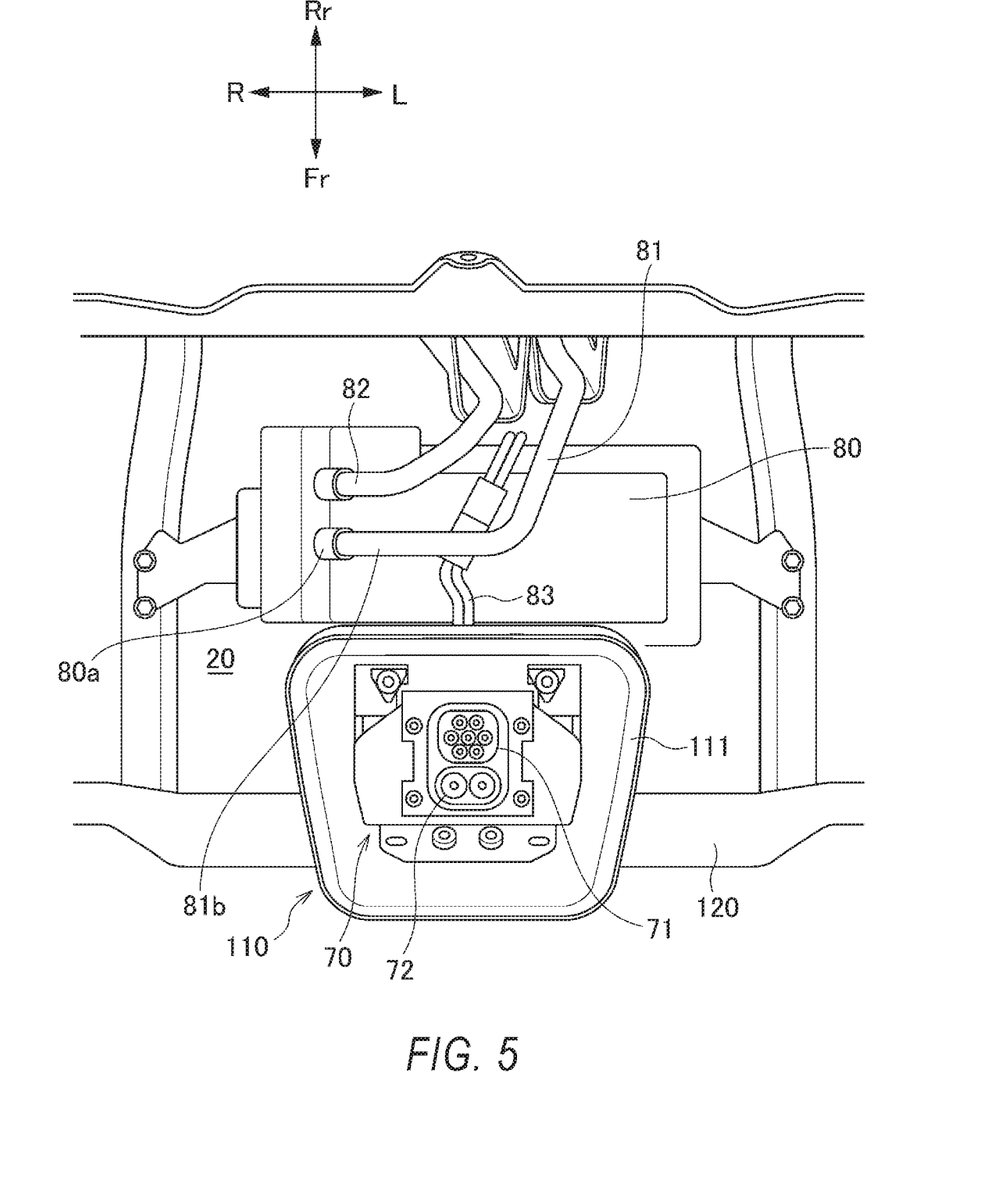
FIG. 5 is a plan view of a charging port of the vehicle of FIG. 1 and the periphery thereof.

As shown in FIGS. 4 and 5, the battery cable 81 and the PCU cable 82 are disposed adjacent to each other in the front room 20. With this configuration, the battery cable 81 and the PCU cable 82, which are high voltage lines, can be disposed intensively.

[Charge Port Accommodation Portion]

As shown in FIGS. 4 and 5, the charging port 70 is disposed in a charging port accommodation portion 110 constituted by a charging case 111 and a charging lid 112. The battery cable 81 and the PCU cable 82 are disposed in a rear side of the charging port accommodation portion 110, within the width of the charging port accommodation portion 110 (between a left end and a right end) in the width direction of the vehicle 1, and below the rear end portion of the charging port accommodation portion 110 in a height direction of the vehicle 1. According to this configuration, the battery cable 81 and the PCU cable 82, which are high voltage lines, can be disposed at places where the user is difficult to access.

In addition, the charging port accommodation portion 110 is fixed to a bulkhead 120 so as to overlap with the bulkhead 120 constituting the front end portion of the vehicle 1 in the top view. As a result, a gap is not formed between the charging port accommodation portion 110 and the bulkhead 120, and the user is prevented from accessing high voltage components in the front room 20. Further, winding of the necktie into the radiator fan 92 or the like can be suppressed.

As shown in FIG. 4, in the open state of a front hood 21 covering the front room 20, an opening width L2 of the space formed in the rear side of the charging port accommodation portion 110 in the front-rear direction is shorter than a width L1 of the charging port accommodation portion 110. As described above, by shortening the opening width L2 of the space formed in the rear side of the charging port accommodation portion 110, the user is less likely to access the battery cable 81.

The above-described embodiment may be appropriately modified, improved, or the like. For example, at least a part of the junction box 80 may be disposed anywhere in the front room 20 as long as a part of the junction box 80 overlaps with the virtual line V connecting the charging port 70 and the battery connector 62 in a side view.

At least the following matters are described in this specification. Although corresponding constituent elements or the like in the above-described embodiment are illustrated in parentheses, the present invention is not limited thereto.

(1) A vehicle (vehicle 1) includes:
a vehicle interior (vehicle interior 10);
a battery (battery 60) provided below the vehicle interior with a floor panel (floor panel 2) therebetween;
a front room (front room 20) provided in front of the vehicle interior with a dashboard (dashboard 3) therebetween;
a charging port (charging port 70) disposed in the front room; and
a junction box (junction box 80) electrically connecting a first power line (quick charging cable 83) extending from the charging port and a second power line (battery cable 81) extending from a power line connection portion (battery connector 62) of the battery,
in which the junction box is disposed on a virtual line (virtual line V) connecting the charging port and the power line connection portion in a side view.

According to (1), since the junction box is disposed on the virtual line connecting the charging port and the power line connection portion in the side view, the lengths of the first power line and the second power line can be shortened. As a result, the power transmission loss in the charging path can be suppressed, and the charging efficiency can be improved. In addition, since the lengths of the first power line and the second power line can be shortened, the manufacturing cost can be reduced.

(2) In the vehicle according to (1), the first power line and the second power line are DC lines.

According to (2), since the first power line and the second power line are DC lines used for quick charging, a large diameter cable required for the quick charging path can be shortened, and the manufacturing cost and the cable weight can be reduced.

(3) In the vehicle according to (1) or (2), the front room is provided with the junction box, a charger (charger 90) connected via the charging port and a third power line (normal charging cable 84), and a DC-DC converter (DC-DC converter 100), the junction box is disposed above the charger and the DC-DC converter, and the second power line is disposed along the virtual line in a side view.

According to (3), since the second power line is disposed along the virtual line, the length of the second power line can be shortened and the manufacturing cost can be reduced.

(4) In the vehicle according to (3), one end portion (cable connector 81*a*) of the second power line is connected to the power line connection portion from the front side, and the other end portion (cable connector 81*b*) of the second power line is connected to the second power line connection portion (JB connector 80*a*) of the junction box from a vehicle width direction.

According to (4), the second power line can be gently bent by changing the connection direction of the second power line between the power line connection portion and the second power line connection portion.

(5) In the vehicle according to any one of (1) to (4), the charging port is disposed in a charging port accommodating portion (charging port accommodation portion 110) including a charging case (charging case 111) and a charging lid (charging lid 112), and the second power line is disposed in a rear side of the charging port accommodation portion in a front-rear direction of the vehicle, within a width of the charging port accommodation portion in the vehicle width direction, and below a rear end portion of the charging port accommodation portion in a height direction of the vehicle.

According to (5), the second power line, which is a high voltage line, can be disposed at a place where the user is hard to access.

(6) In the vehicle according to (5), the charging port accommodation portion is disposed so as to overlap with a bulkhead (bulkhead 120) constituting a front end portion of the vehicle in a top view.

According to (6), a gap is not formed between the charging port accommodation portion and the bulkhead by disposing the charging port accommodation portion and the bulkhead so as to overlap each other. Therefore, the user is prevented from accessing the high voltage components in the front room. In addition, winding of a necktie or the like into a radiator fan or the like can be suppressed.

(7) In the vehicle according to (5) or (6), an opening width (opening width L2) of a space formed in the rear side of the charging port accommodation portion in the front-rear direction is shorter than a width (width L1) of the charging port accommodation portion in an open state of a front hood (front hood 21) covering the front room.

According to (7), the user is less likely to access the second power line by shortening the opening width of the space formed in the rear side of the charging port accommodation portion.

(8) The vehicle according to any one of (1) to (7) further includes:

a driving device unit (driving device unit 30) which is disposed in the rear side of the battery, and receives electric power from the battery to drive the vehicle, and a fourth power line (PCU cable 82) connecting the junction box and the driving device unit, a combined length of the first power line and the second power line is shorter than a combined length of the second power line and the fourth power line.

According to (8), since the combined length of the first power line and the second power line, that is, the length of the power transmission path during charging, is shorter than the combined length of the second power line and the fourth power line, that is, the length of the power transmission path during discharging, the power transmission loss in the charging path can be reduced to improve the charging efficiency.

(9) In the vehicle according to (8), the second power line and the fourth power line are disposed adjacent to each other in the front room.

According to (9), since the second power line and the fourth power line are disposed adjacent to each other in the front room, the second power line and the fourth power line, which are high voltage lines, can be intensively disposed.

The invention claimed is:

1. A vehicle comprising:
a vehicle interior;
a battery provided below the vehicle interior with a floor panel therebetween;
a front room provided in front of the vehicle interior with a dashboard therebetween;
a charging port disposed in the front room; and
a junction box electrically connecting a first power line extending from the charging port and a second power line extending from a power line connection portion of the battery, wherein
the junction box is disposed on a virtual line connecting the charging port and the power line connection portion in a side view,
the junction box, a charger connected to the charging port via a third power line, and a DC-DC converter are disposed in the front room,
the junction box is disposed above the charger and the DC-DC converter, and
the second power line is disposed along the virtual line in a side view.

2. The vehicle according to claim 1, wherein the first power line and the second power line are DC lines.

3. The vehicle according to claim 1, wherein
one end portion of the second power line is connected to the power line connection portion from the front side, and
the other end portion of the second power line is connected to the second power line connection portion of the junction box from a vehicle width direction.

4. The vehicle according to claim 1, wherein
the charging port is disposed in a charging port accommodating portion including a charging case and a charging lid, and
the second power line is disposed in a rear side of the charging port accommodation portion in a front-rear direction of the vehicle, within a width of the charging port accommodation portion in the vehicle width direction, and below a rear end portion of the charging port accommodation portion in a height direction of the vehicle.

5. The vehicle according to claim 4, wherein the charging port accommodation portion is disposed so as to overlap with a bulkhead constituting a front end portion of the vehicle in a top view.

6. The vehicle according to claim 4, wherein an opening width of a space formed in the rear side of the charging port accommodation portion in the front-rear direction is shorter than a width of the charging port accommodation portion in an open state of a front hood covering the front room.

7. The vehicle according to claim 1, further comprising:
a driving device unit which is disposed in the rear side of the battery, and receives electric power from the battery to drive the vehicle, and
a fourth power line connecting the junction box and the driving device unit,
wherein a combined length of the first power line and the second power line is shorter than a combined length of the second power line and the fourth power line.

8. The vehicle according to claim 7, wherein the second power line and the fourth power line are disposed adjacent to each other in the front room.

\* \* \* \* \*